US010333792B2

(12) United States Patent
Shin et al.

(10) Patent No.: US 10,333,792 B2
(45) Date of Patent: Jun. 25, 2019

(54) MODULAR CONTROLLER IN SOFTWARE-DEFINED NETWORKING ENVIRONMENT AND OPERATING METHOD THEREOF

(71) Applicant: Korea Advanced Institute of Science and Technology, Daejeon (KR)

(72) Inventors: Seungwon Shin, Daejeon (KR); Jaehyun Nam, Gyeonggi-do (KR); Hyeonseong Jo, Gyeongsangnam-do (KR); Yeonkeun Kim, Seoul (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 222 days.

(21) Appl. No.: 15/367,251

(22) Filed: Dec. 2, 2016

(65) Prior Publication Data
US 2017/0310551 A1 Oct. 26, 2017

(30) Foreign Application Priority Data

Apr. 21, 2016 (KR) .................. 10-2016-0048620

(51) Int. Cl.
G06F 15/173 (2006.01)
H04L 12/24 (2006.01)
G06F 16/955 (2019.01)
H04L 12/26 (2006.01)

(52) U.S. Cl.
CPC ............ H04L 41/12 (2013.01); G06F 16/955 (2019.01); H04L 41/0893 (2013.01); H04L 41/28 (2013.01); H04L 43/08 (2013.01); H04L 43/0876 (2013.01); H04L 43/16 (2013.01); H04L 41/06 (2013.01)

(58) Field of Classification Search
CPC ..... H04L 41/06; H04L 41/12; H04L 41/0893; H04L 41/28; H04L 43/08; H04L 43/0876; H04L 43/16; G06F 17/30876
USPC .................................................. 709/223, 224
See application file for complete search history.

(56) References Cited

U.S. PATENT DOCUMENTS

| 9,450,817 | B1 * | 9/2016 | Bahadur ................. H04L 45/64 |
| 2006/0136933 | A1 * | 6/2006 | Jensen .................... G06F 9/542 |
| | | | 719/318 |
| 2006/0218277 | A1 * | 9/2006 | Birkestrand .......... G06F 9/5061 |
| | | | 709/226 |

(Continued)

Primary Examiner — Liang Che A Wang
Assistant Examiner — Johnny B Aguiar
(74) Attorney, Agent, or Firm — Hauptman Ham, LLP

(57) ABSTRACT

Disclosed are a modular controller and an operating method thereof. An operating method of a modular controller having a plurality of modules in a software-defined network environment includes generating a first event including a message that is received from a network device, transmitting the first event to an event handler, transmitting the first event to the plurality of modules from the event handler, determining whether the first event is identical to a target event in event type through the plurality of modules that receive the first event, and performing a function of a first module, which corresponds to the identity between the first event and the target event, by using the first event. A network manager is able to easily form a controller with various functions such as performance enhancement and security enhancement at need, facilitating combination and separation of different modules in a controller.

14 Claims, 6 Drawing Sheets

(56) References Cited

U.S. PATENT DOCUMENTS

| | | | |
|---|---|---|---|
| 2007/0174839 A1* | 7/2007 | Takahashi | G06F 9/485 |
| | | | 718/100 |
| 2011/0072442 A1* | 3/2011 | Abdelhadi | G06F 9/542 |
| | | | 719/318 |
| 2015/0249568 A1* | 9/2015 | Koide | H04L 45/02 |
| | | | 370/254 |
| 2016/0232033 A1* | 8/2016 | Hasegawa | G06F 9/5005 |
| 2016/0330113 A1* | 11/2016 | Chiba | H04L 45/38 |
| 2017/0109409 A1* | 4/2017 | Nagy | H04L 29/08072 |
| 2017/0115728 A1* | 4/2017 | Park | G02B 27/0093 |

* cited by examiner

MODULAR CONTROLLER IN SOFTWARE-DEFINED NETWORKING ENVIRONMENT AND OPERATING METHOD THEREOF

CROSS-REFERENCE TO RELATED APPLICATIONS

A claim for priority under 35 U.S.C. § 119 is made to Korean Patent Application No. 10-2016-0048620 filed Apr. 21, 2016, in the Korean Intellectual Property Office, the entire contents of which are hereby incorporated by reference.

BACKGROUND

Embodiments of the inventive concept described herein relate to a modular controller and operating method thereof, and more particularly, relate to a modular controller in a software-defined networking environment and an operating method thereof.

Software-Defined Networking (SDN) means the technology of managing all network devices by an intelligent central management system. The SDN technology may be more practical in developing and allowing diverse functions than traditional network structure by processing control operations, which are related to packet processes that have been performed through a preexisting network device by itself, through a controller which is provided in the form of software.

An SDN system is generally structured of a controller for controlling the overall network, a plurality of OpenFlow switches for processing packets in control of a controller server, and a host as a lower layer of the OpenFlow switch. In this case, the OpenFlow switch operates simply in charge of transmission/reception transaction, while the controller arranges routes of packets, and manages and controls the packets. Therefore, the basic structure of the SDN system may be simply said as separating a control plane and a data plane which constitute a network device.

In an SDN environment, controllers act for regulating and managing the environmental network conditions while they are provided in open source types, for example, ONOS, PDX, and OpenDayLight. But, because such controllers are basically formed of different architectures and software APIs, it is difficult to use other controllers in a single network.

For example, in the case of using controllers respectively by users in a single network, one of the users may regard performance of the controller as important while another user may regard security as important. As modules related to improvement of security, there have been already published, for example, Role-based authorization, Control flow integrity, and Openflow message verification. However, it could be still difficult for a network operator to adjust the levels of expandability, performance, and security because the controllers are preliminarily provided in a consolidated form. Therefore, if an operator is able to form a controller by combining diverse modules in a network which needs to be reinforced for specific functionality, the operator may maintain the network in harmony with the circumstances thereof.

SUMMARY

Embodiments of the inventive concept provide a controller easily forming various functions such as reinforcement of performance and security in need of a network operator.

Additionally, embodiments of the inventive concept provide a modular controller easy in combining and separating modules which have different functions, and an operating method of the controller.

The directions of the inventive concept may not be restrictive to the aforementioned, other directions, which are not mentioned herein, and advantages of the inventive concept may be suggested through the description below and apparently understood by embodiments of the inventive concept. Additionally, it can be easily seen that the directions and advantages of the inventive concept may be accomplished through means and combinations arranged in the annexed claims.

According to an aspect of an embodiment, an operating method of a modular controller having a plurality of modules in a software-defined network environment includes generating a first event including a message that is received from a network device, transmitting the first event to an event handler, transmitting the first event to the plurality of modules from the event handler, determining whether the first event is identical to a target event in event type through the plurality of modules that receive the first event, and performing a function of a first module, which corresponds to the identity between the first event and the target event, by using the first event.

According to another aspect of an embodiment, a modular controller having a plurality of modules in a software-defined network environment includes a message I/O module configured to generate a first event including a message received from a network device and configured to transmit the first event to an event handler, the event handler configured to transmit the first event to the plurality of modules, and a first module configured to determine whether the first event is identical to a target event of the module in event type if the first event is received, and configured to perform a function with the first event if the first event is identical to the target event.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
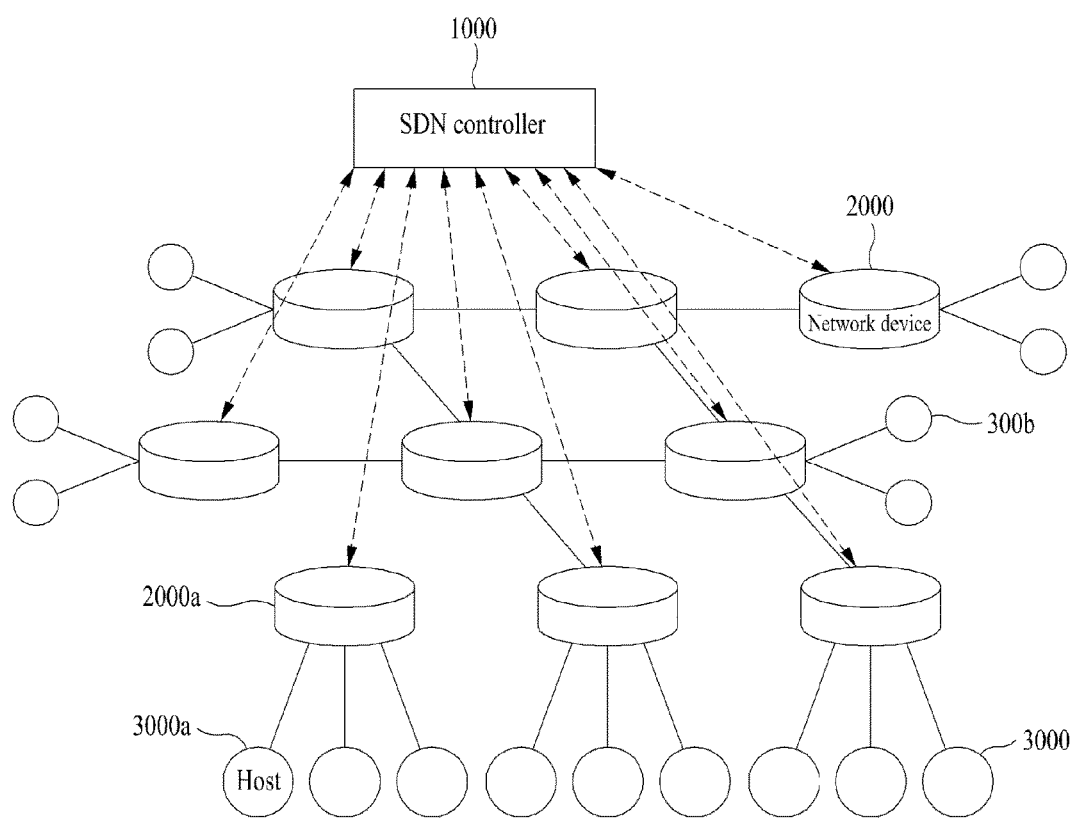
FIG. 1 is a diagram illustrating a configuration of a software-defined network.

The aforementioned directions, features, and advantages will be described below in conjunction with the figures and
} those skilled in the art may easily implement embodiments of the inventive concept with reference to the description. In describing embodiments of the inventive concept, some published or known matters will not be described to avoid vagueness of the essentials of the inventive concept. Hereinafter, preferred embodiments of the inventive concept will be described in conjunction with the figures. Throughout the figures, like reference numerals indicate the same or similar elements.

In the specification, the term "modular controller" means a controller for managing one or more network devices in a software-defined networking environment. A modular controller, a control device, an SDN controller, and a controller, which are used hereafter, are all regarded as a modular controller according to embodiments of the inventive concept.

Additionally, the term "event" as used herein is information that is exchanged between modules forming a modular controller according to embodiments of the inventive concept. Such information has a new data form defined by embodiments of the inventive concept. In the case of information including the term "event", such as "first event" and "second event", used for convenience of description in the specification, their forms may be regarded as the same even if their contents are different.

Additionally, the term "flow rule" as used herein means a network policy which is applicable to a controller server of a software-defined network by those skilled in the art. An OpenFlow switch may be interpreted as meaning a flow entry based on a network policy.

FIG. 1 is a diagram illustrating a configuration of a general software-defined network.

Referring to FIG. 1, FIG. 1 is a diagram illustrating a configuration of a software-defined network. In embodiments of the inventive concept, a software-defined network may include an SDN controller 1000, a network device 2000, and a host 3000. The network device 2000 and the host 3000 may be indicated as nodes. A link may mean a connection between two nodes. The modular controller 1000 is provided to manage the network device 2000. The modular controller 1000 may manage and control a plurality of the network devices 2000 in a centralization mode.

In detail, the SDN controller 1000 according to embodiments of the inventive concept may be implemented with software, which is mounted in a modular type, functioning topology management, path management relative to packet processing, link discovery, and flow management.

The network device 2000 may process packets under control of the SDN controller 1000. As examples of the network device 2000, there are a mobile communication base station, a base station controller, a gateway device, a wired network switch, and a router.

The most general network device 2000 used in a software-defined network is an OpenFlow switch 2000. The OpenFlow switch 2000 may be understood as including a switch supporting an OpenFlow protocol only, a virtual switch supporting the OpenFlow protocol, and a general L2 switch supporting the OpenFlow protocol, whereas the modular controller 1000 according to embodiments of the inventive concept may control even a switch, which supports Netconf protocol, as well as the switch supporting the OpenFlow protocol. Accordingly, embodiments of the inventive concept may not be restrictive in kinds of protocols used for information exchange between the modular controller 1000 and the switch 2000 in a software-defined networking environment. As the OpenFlow protocol is most widely used for the information exchange protocol, embodiments of the inventive concept will be described with the case that the network device 2000 is the OpenFlow switch 2000.

In more detail about the OpenFlow switch 2000, the OpenFlow switch 2000 may exchange information with the modular controller 1000 through a security channel. The security channel is a communication channel between the switch 2000 and the modular controller 1000 which is distant from the switch 2000. Information exchanged between the modular controller 1000 and the switch 2000 may be encoded.

The OpenFlow switch 2000 may be equipped with one or more flow tables for regulating and processing packets and including statistics information relative to the packets. The flow table may be formed of a flow rule which regulates the packet processing. The flow rule may be added, corrected, or deleted by a flow mode message which is generated from the modular controller 1000 and transmitted to the OpenFlow switch 2000.

The OpenFlow switch 2000 may process packets with reference to the flow table. The flow table may include match information (Match Field) about packets defining flows, operation information (Instruction) defining the packet processing, and statistics information (Stats) for each flow. Each row of the flow table is called flow entry. The flow entries may be arranged in priority. The switch may process packets based on operation information of the highest priority one among the flow entries matching with information of the packets.

The host 3000 means a terminal corresponding to a lower layer of the switch 2000. The host 3000 may be used as wholly indicating a client and a server. The host 3000 may generate a packet which is to be transmitted to another host through a software-defined network, and transmit the packet to the switch 2000 through a port of a network interface.

For example, when a first host 3000a needs to transmit a packet to a second host 3000b, the first host 3000a may generate the packet to be transmitted, and transmit the packet to an OpenFlow switch 2000a connected with the first host 3000a. In the case that a flow entry matching with the packet is present in the OpenFlow switch receiving the packet, the packet is processed under the flow entry rule. Otherwise, in the case that a flow entry matching with the packet is absent in the OpenFlow switch 2000a, the OpenFlow switch 2000a may transmit a packet-in message which informs the controller 1000 of a packet inflow. The controller 1000 may generate flow rule modification items, which regulate the packet processing, and transmit the modification items to the OpenFlow switch 2000a. The OpenFlow switch 2000a may change a state based on the flow rule modification items and then perform the packet processing.

To allow the controller 1000 to receive a packet-in message and to generate flow rule modification items for regulating the packet processing, it is necessary to generate flow rule modification items by performing topology management and packet processing related path management through software loaded in the controller 1000. The modular controller 1000 according to embodiments of the inventive concept makes a user efficiently manage a network in harmony with various network environments by modularizing functions of the controller 1000 for flow rule modification and by providing combinations of modules corresponding to functions which the user wants.

Figure 2:
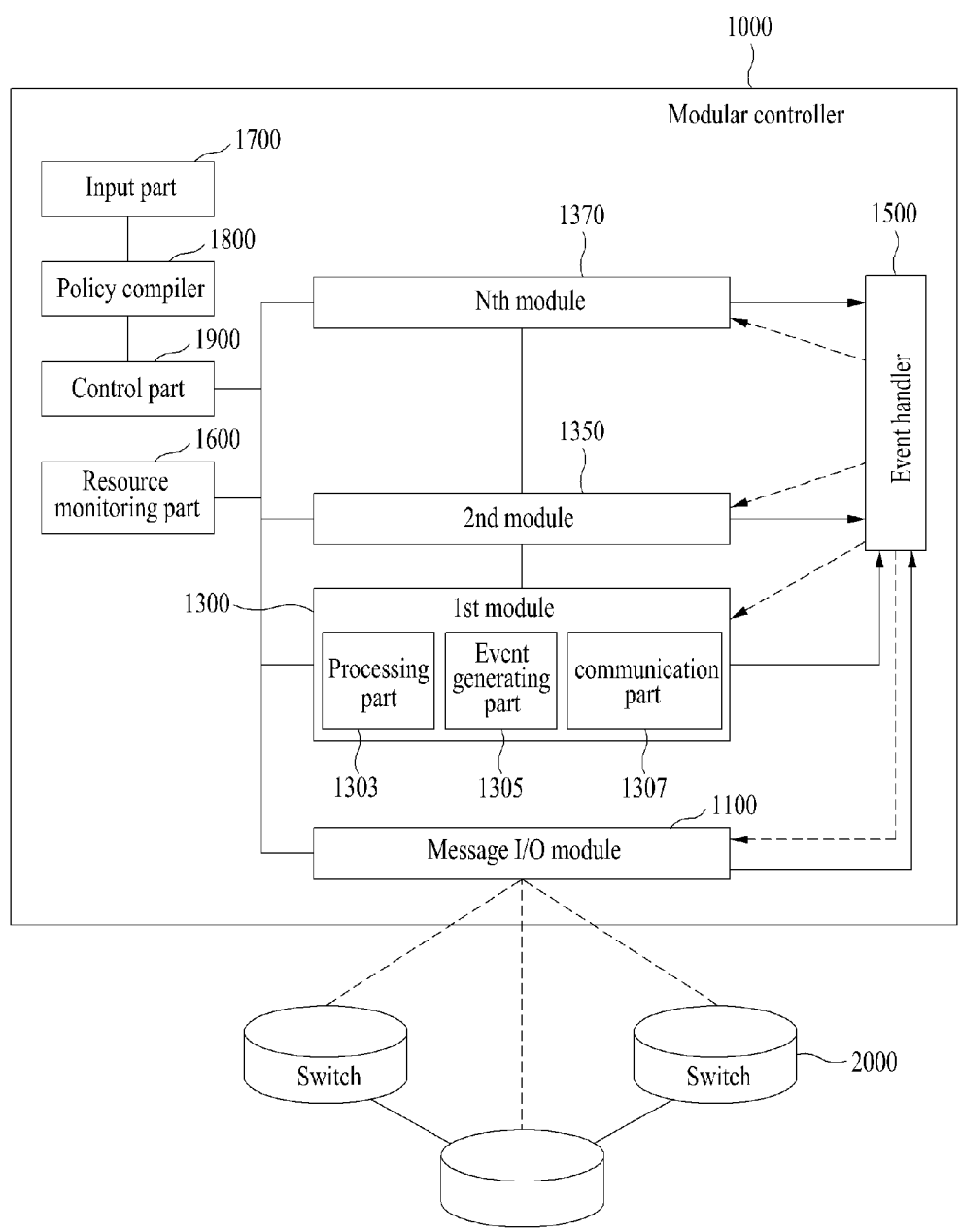
FIG. 2 is a diagram illustrating a configuration of a modular controller according to an embodiment of the inventive concept.

FIG. 2 is a diagram illustrating a configuration of a modular controller according to an embodiment of the inventive concept.

Referring to FIG. 2, a modular controller 1000 may include a plurality of modules including a message input/ output (I/O) module 1100 and a first module 1300, and an event handler 1500. The modular controller 1000 may further include a resource monitoring part 1600, an input part 1700, a policy compiler 1800, and a control part 1900.

The message I/O module 1100 may receive a message from the network device 2000. The message received from the network device 2000 may be a control message for controlling, managing, and setting a path of a packet. For example, the message applied into the message I/O module 1100 in the embodiment of FIG. 1 is a packet-in message.

The message I/O module 1100 may generate a first event including a message which is received from a network device. The first event, as information exchanged between modules in the modular controller 1000, may include a data field having a message and an event-type field having information about the data field.

Thus, the message I/O module 1100 may generate a data field having a message and an event-type field having information about the data field, and the first module 1300 may include an event generating part 1305 for generating a first event having a data field and an event-type field. The message I/O module 1100 may transmit the first event to the event handler 1500.

If the first event is received, the event handler 1500 may transmit the first event to a plurality of modules included in the modular controller 1000. The event handler 1500 may receive events from modules of the modular controller 1000 operating based on events, and transmit the events to all the modules. Accordingly, the modules included in the modular controller 1000 may exchange messages through the event handler 1500 without direct message exchanges between the modules. This manner facilitates modification and separation of module and allows a user to more easily customizing the controller.

The plurality of modules, such as the first module 1300, a second module 1350, and an Nth module 1370, included in the modular controller 1000 may determine whether a first event is identical to a target event in event type if the first event is received. If the first event is identical to the target event, the plurality of modules may perform their functions by using the first event. The determination for the identity to the target event type of the module may be performed based on an environment setup file which is preliminarily prepared by a user. The user may register target event types, which can be processed by the modules, in the environment setup file.

For example, a user may register CR_QUEUE_MSG_IN and CR_QUEUE_MSG_OUT events in a protocol parser module, CR_DELIVERY_TO_UP and CR_DELIVERY_TO_DOWN events in a message arbiter module, as target events. In this case, if the CR_QUEUE_MSG_IN event is received from the event handler, the protocol parser module may determine as being identical because its corresponding even type is registered as a target event type of the protocol parser module in an environment setup file, and perform its module function by using the event.

As another example, a user may register CR_OFP_MSG_IN, CR_OFP_ERROR, CR_OFP_PACKET_IN, CR_OFP_FLOW_REMOVED, CR_ODP_PORT_STATUS events as target events of an OpenFlow engine module. In the case of transmitting the CR_OFP_PACKET_IN event to all the modules through the event handler, only the OpenFlow engine module of the modules will receive and process the CR_OFP_PACKET_IN event.

The first module 1300 may include a processing part 1303 performing its inherent function to process a first event, an event generating part 1305 generating a second event based on a result of the processing, and a communication part 1307 transmitting the second event to the event handler 1500. Other modules 1350 and 1370 included in the modular controller 1000 may also include the processing part 1303, the event generating part 1305, and the communication part 1307.

The resource monitoring part 1600 may monitor resource use amounts of the plurality of modules. If the monitoring finds that a resource use amount of some module is equal to or larger than a reference, the corresponding module is restricted in operation. The resource monitoring part 1600 is also one of the plurality of modules forming the modular controller 1000, but it is different from other modules in independent functionality.

The input part 1700 may receive requirements, which are necessary for network management, from a user, or receive a controller mode. Additionally, the input part 1700 may even receive information, about an individual activation module, which informs of which module is to be activated. The input part 1700 may be used for generating an environment setup file before the modular controller 1000 operates.

The policy compiler 1800 may generate optimum module combination information by analyzing functions of the modules, resource use amounts of the modules, and requirements input from a user. The policy compiler 1800 may preliminarily operate for generation of optimum module combination information before the modular controller 1000 is driven. In more detail, the policy compiler 1800 may generate module combination information, which reflects functions of the modules, resource use amounts of the modules, and requirements of a user, by using an algorithm previously set by the user. For example, it is permissible to combine modules, which are necessary for network management, in the manner of selecting a module, among modules performing similar functions, which spends the least resource use amount. Additionally, in the case that a requirement of a user is for enhancement of security, the policy compiler 1800 may combine modules in the manner of including a module, which performs a function of enhancing security, in module combination information. Although a user is able to selectively combine and use modules without the policy compiler 1800, the policy compiler 1800 may automatically generate and provide an optimum module combination, which corresponds to a user's requirement, to the user, thus contributing to enhancement of the user's convenience and the effectiveness of the controller 1000.

The control part 1900 may activate one or more modules corresponding to module combination information which is generated from the policy compiler 1800, or activate an essential module and one or more modules corresponding to a controller mode. Otherwise, modules may be activated respectively in response to user's requirements for activation. As such, in the case that the control part 1900 activates some of all the modules included in the modular controller 1000, only the activated part of the module may receive events from the event handler 1500 and determine whether types of the received events are identical to target event types registered in the corresponding modules. Thus, in the modular controller 1000 operating based on events, modules activated by module combination information, user's setup, and controller mode input may perform their functions.

Figure 3:
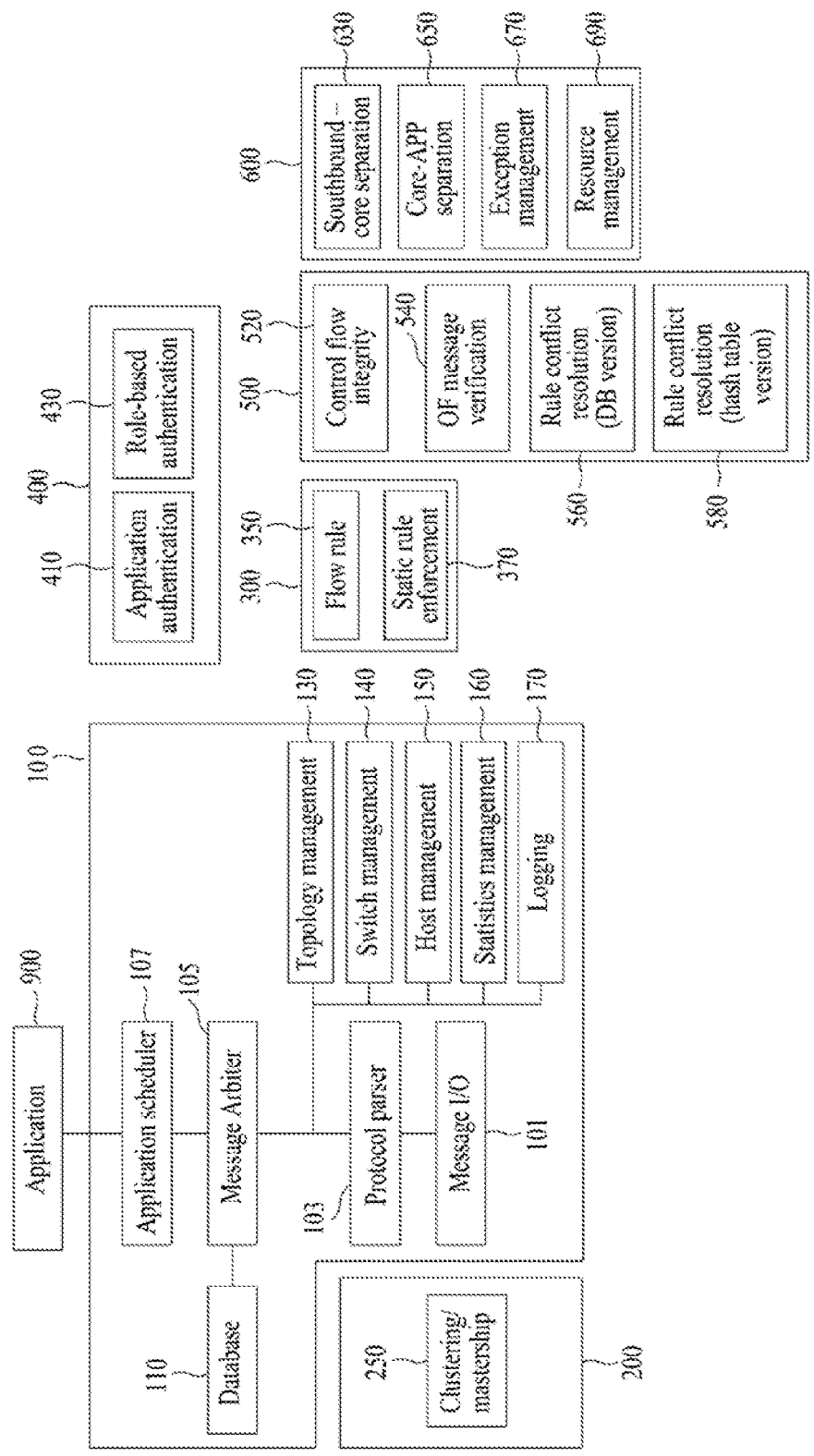
FIG. 3 is a configuration diagram illustrating a combination of modules included in a modular controller according to an embodiment of the inventive concept.

Hereafter, FIG. 3 will be referred to describe a combination of the aforementioned essential module and modules for each controller mode.

FIG. 3 is a configuration diagram illustrating a combination of modules included in a modular controller according to an embodiment of the inventive concept.

Referring to FIG. 3, a modular controller 1000 according to an embodiment of the inventive concept may include an essential module 100, one or more modules 200 corresponding to an expandability-enhancive mode, one or more modules 300 corresponding to a performance-enhancive mode, one or more modules 400 corresponding to a confidentiality-enhancive mode, one or more modules 500 corresponding to a data integrity secured mode, and one or more modules 600 corresponding to a usability-enhancive mode. An application 900 shown in FIG. 3 is illustrated for convenience of description, which means a software-defined networking application or a business application of an application layer operating on the modular controller 1000 according to embodiments of the inventive concept. The application 900 may be implemented in, for example, L2 forwarding, and Statistics Monitor.

First, the essential module 100 may include a message I/O engine module 101, a protocol parser module 103, a message arbiter module 105, an application scheduler module 107, a database module 110, a topology management module 130, a switch management module 140, a host management module 150, a statistics management module 160, a logging module 170.

The message I/O module 101, which is the same with the aforementioned message I/O module 1100, is a kind of network interface module for receiving a message from the network device 2000 and transmitting a message to the network device 2000. The message I/O module 101 may generate a first event including the aforementioned message, and transmit the first event to the event handler. The event handler may transmit the first event to the plurality of modules. The protocol parser module 103 may receive the first event and perform its function.

The protocol parser module 103 may identify a kind of message and checks a message by using an analyzing engine corresponding to the kind of message. For example, if an event is received, the protocol parser module 103 may identify which one of an OpenFlow protocol, a network configuration (Netconf) protocol, and a Simple Mail Transfer Protocol (SMTP) is used to generate a message included in the event. A processing part included in the protocol parser 103 may check a message by using an analyzing engine corresponding thereto.

The message arbiter module 105 may act as a switch board for routing a message based on an event type.

The application scheduler module 107 may distribute messages to a plurality of applications. The applications may be registered in the application scheduler module 107 for which kind of message will be received. The application scheduler module 107 may be employed with a round-robin scheduler or priority-based scheduler.

The database module 110 may be employed with a local database, an in-memory database, or a distributed database managing a network status environment setup, and other content. A multiple database may be operable in a single Network Operating System (NOS). In the case that a controller mode is an expandability-enhancive mode and a performance-enhancive mode, the database module 110 may be employed with a distributed database.

The topology management module 130 may periodically transmit a Link Layer Discovery Protocol (LLDP) to the switch 2000 connected therewith, and receive topology information from the switch. This operation may maintain the network topology in a graph.

The switch management module 140 may manage the switch 2000 connected therewith, and collect information, relating to the switch 2000, such as a data path ID, a switch status, and the number of ports. Additionally, if the switch changes, modification items are correspondingly updated in an internal storage.

The host management module 150 may manage hosts 3000 connected therewith in a similar manner with the switch management module 140. The host management module 150 may support dynamic host migration.

The statistics management module 160 may periodically request statistical information of the current switch 2000, and allow the application 900 to use the statistical information through a DB service.

The logging module 170 may record logging messages, which arise respectively from the modules, together with their priorities. For example, messages of FATAL, ERROR, WARNING, INFO, and DEBUG may be recorded therein.

One or more modules 200 corresponding to an expandability-enhancive mode may include a clustering/mastership module 250. The clustering/mastership module 250 may allow instances of a plurality of modular controllers 1000 to share a network status. Additionally, in an expandability-enhancive mode, it is preferred to employ a distributed database for the database 110.

One or more modules 300 corresponding to a performance-enhancive mode may include at least one of a flow-rule cache module 350, and a static rule enforcement module 370. The flow-rule cache module 350 may store a flow rule, which is to be inserted into the switch 2000, in a cache. A flow rule stored in a cache before insertion of a flow table into the switch may be considered preferentially. When the switches 2000 are being in connection, the static rule enforcement module 370 may apply a pre-defined flow rule thereto. In a performance-enhancive mode, it is also preferred to adopt a distributed database for the database 110.

One or more modules 400 corresponding to a confidentiality-enhancive mode may include at least one of an application authentication module 410 and a role-based authentication module 430.

The application authentication module 410 may provide a load time confirming service for data integrity and reliability of other company's application from which an NOS loading is requested. The role-based authentication module 430 may allow an operator to set access restriction to Application Program Interface (API) for each module. The role-based authentication module 430 may filter APIs, which are issued by an application, to permit access only to a specific API based on a role of the application.

One or more modules 500 corresponding to data integrity securing mode may include at least one of a control flow integrity module 520, an OpenFlow message verification module 540, a DB version rule conflict resolution module 560, and a hash table version rule conflict resolution module 580.

In the case that some modules are damaged in a runtime, the control flow integrity module 520 may trigger an unexpected event or access an internal storage. The control flow integrity module 520 may monitor an event chain from a source to a destination, and interrupt an abnormal event.

When a partial field of a control message is damaged due to various application errors, the OpenFlow message verification module 540 may provide a service for inspecting a control message content to identify "out-of-specification" content.

The DB version rule conflict resolution module 560 may detect a conflict between a newly enforced flow rule and an existing flow rule. In this version, the module 560 may identify all match fields and an action field.

The hash table version rule conflict resolution module 580 is the same with the DB version rule conflict resolution module 560 in mechanism. But the hash table version rule conflict resolution module 580 may identify only a 5-tuple (IP addresses of departure point and destination, ports of departure point and destination, protocol) and an action field.

One or more modules 600 corresponding to a usability-enhancive mode may include at least one of a southbound-core separation module 630, a core-application separation module 650, an exception management module 670, and a resource management module 690.

In the case that one of southbound layer or core layer is damaged, the southbound-core separation module 630 may restore the damaged layer, while the undamaged one is operating, to prevent all NOS functions from stopping.

The core-application separation module 650 may separate an application from a core layer to protect the core layer from an error due to the application. This module may maintain its work status even if a core later is damaged due to an application. Unless that, an error may occur while performing other NOS.

In the case that a module is damaged, the exception management module 670 may restore the damaged module or the entire NOS. This is because adopting various types of modules in a basic framework contributes to preventing NOS drivability from damage of some of modules.

The resource management module 690 may monitor system resources, such as CPU and memory, as well as inbound and outbound traffic.

Figure 4:
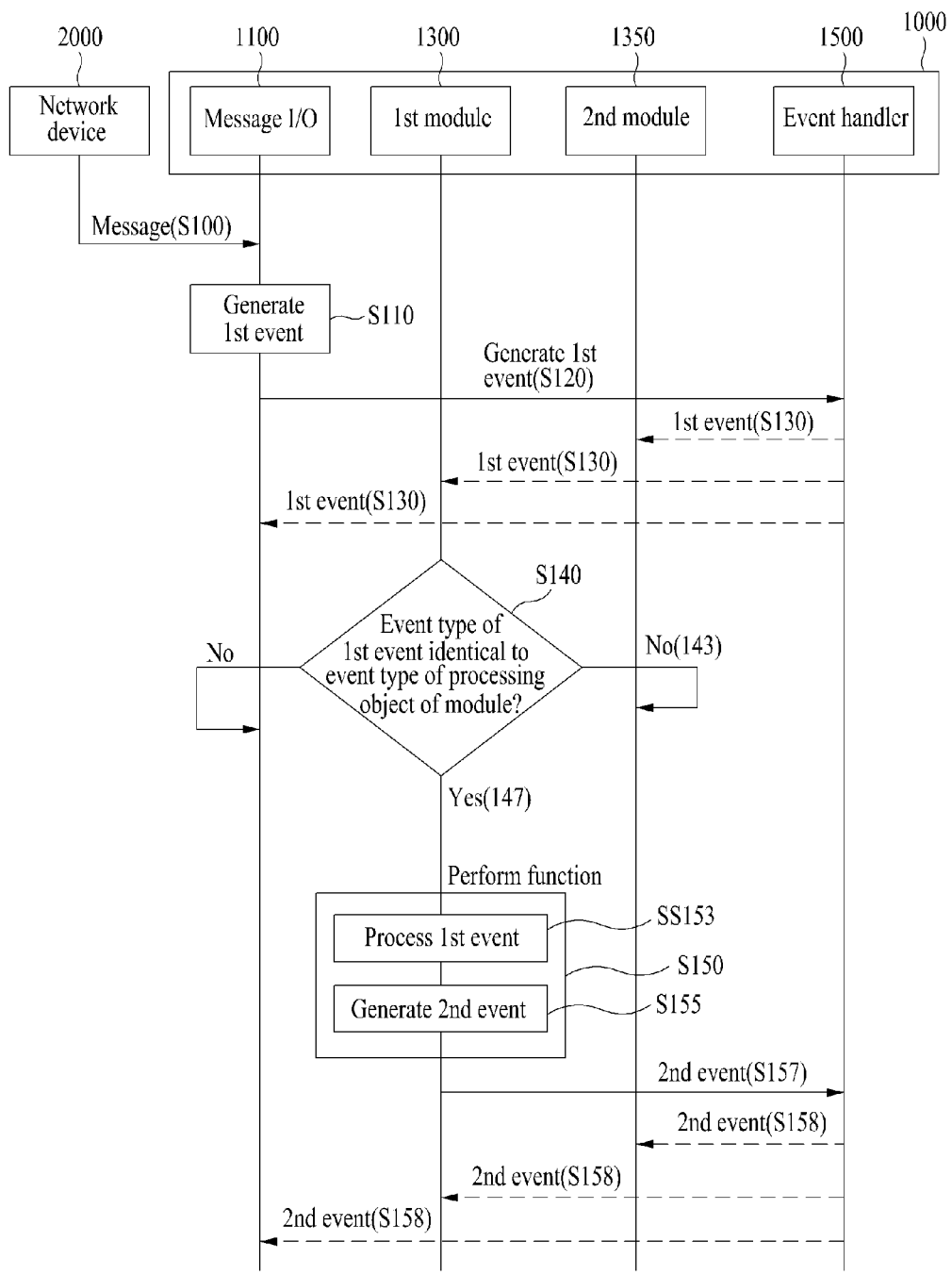
FIG. 4 is a flow chart showing an operating method of a modular controller according to an embodiment of the inventive concept.
Figure 5:
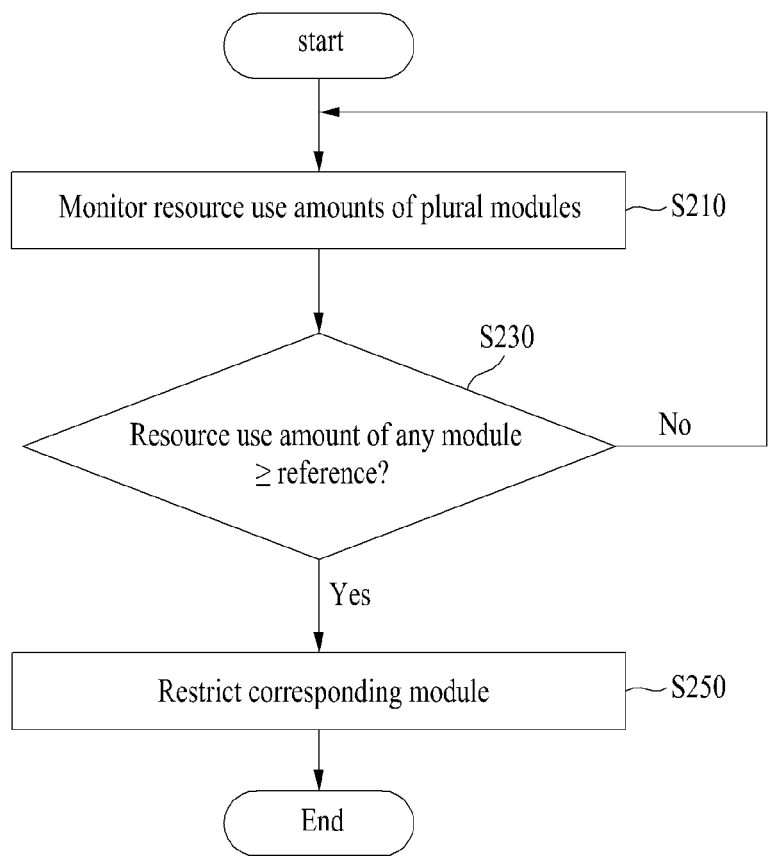
FIG. 5 is a flow chart showing an operating method of a modular controller according to another embodiment of the inventive concept.
Figure 6:
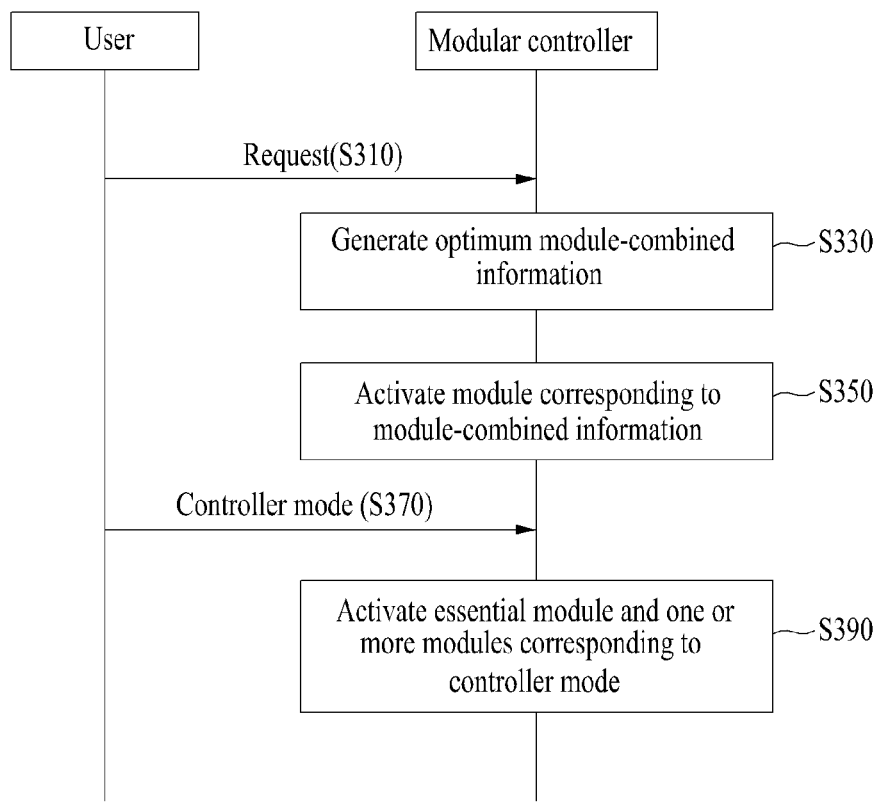
FIG. 6 is a flow chart showing an operating method of a modular controller according to still another embodiment of the inventive concept.

FIGS. 4 to 6 are flow charts showing operating methods of the modular controller according to embodiments of the inventive concept. Hereinafter, FIGS. 4 to 6 will be referred to describe operating methods of the modular controller.

Referring first to FIG. 4, a modular controller 1000 may receive a message from a network device 2000 (S100). Then, a first event may be generated while including the message received from the network device (S110). The step of generating the first event (S110) may include steps of generating a data field having the message received from the network device, generating an event-type field having information about the data field, and generating the first event having the data field and the event-type field. If the message I/O module 1100 generating the first event transmits the first event to an event handler 1500 (S120), the event handler 1500 may transmit the first event to a plurality of modules (S130). The plurality of modules receiving the first event may determine whether the first event is identical to target events of the modules in event type (S140). After the determination, if the first event is identical to the target events of the modules (S147), a first module whose event type is identical the first event may perform a function of the first module by using the first event (S150). A module whose event type is not identical to the first event may ignore the first event (S143). As another example, the determination of the identity may be carried out in a lump based on an environment setup file prepared, not by respective modules receiving an event, by a user through a processing instance such as a control part 1900. In this case, the environment setup file may define target event types for respective modules, each module may receive an event based on a result of the determination of the processing instance and process the event.

The step of performing a function of the first module through the first module by using the first event (S150) may include a step of processing the first event by performing an inherent function of the first module through the first module (S153), after generating a second event based on a result of the processing (S155), and then transmitting the second event to the event handler 1500 (S157).

If the second event is received, the event handler 1500 may transmit the second event to the plurality of modules (S180) as same as when the first event is received (S120). The plurality of modules receiving the second event may determine whether the second event is identical to target events of the modules in event type as same as the step S140.

Referring to FIG. 5, a modular controller 1000 according to an embodiment of the inventive concept may monitor resource use amounts of a plurality of modules (S210), and terminate a module whose resource use amount is equal to or larger than a specific reference (S250).

Referring to FIG. 6, an operating method of a modular controller 1000 according to another embodiment of the inventive concept is as follows. The modular controller 1000 may receive a user's requirement that is necessary for network management (S310), and generate optimum module combination information by analyzing the requirement, resource use amounts, and functions of the modules (S330). And the modular controller 100 may activate one or more modules corresponding to the module combination information (S350). In this case, the step of determining the identity of event types (S140) aforementioned in conjunction with FIG. 4 may be performed only by an activated module.

In the case of receiving a controller mode from a user (S370), an essential module and one or more modules may be activated in correspondence with the controller mode (S390). As also in this case, the aforementioned step of determining the identity of event types (S140) may be performed only by an activated module. A controller mode may have an expandability-enhancive mode, a performance-enhancive mode, a confidentiality-enhancive mode, a data integrity securing mode, and a usability-enhancive mode. The description about the essential module and one or more modules activated respectively for the modes is as same as the description about the modular controller 1000 and thus will not be provided.

According to embodiments of the inventive concept as described above, it may be allowable for a network operator to easily form a controller with diverse functions such as reinforcement of performance and security in need therein.

Additionally, embodiments of the inventive concept may provide a modular controller and an operating method thereof in a software-defined networking environment, then facilitating combination and separation of modules, which differently function, in the controller.

The embodiments of the inventive concept may be variously substituted, transformed, and modified by those skilled in the art without straying from the inventive concept. Therefore, it should be understood that the above embodiments are not restrictive to the description or the annexed figures, but illustrative.

What is claimed is:

1. An operating method of a modular controller having a message input/output module, a plurality of modules, and an event handler module in a software-defined network environment, the method comprising:
   generating module combination information based on a user input;
   activating, among the plurality of modules, a first plurality of modules corresponding to the generated module combination information;

receiving, by the message input/output module, a message from a network device;

generating, by the message input/output module, a first event including the received message;

transmitting, by the message input/output module, the first event to the event handler module;

transmitting, by the event handler module, the first event to the first plurality of modules;

determining, among the first plurality of modules, a first module performing a target event corresponding the first event in event type;

performing, by using the first event, a function of the first module; and monitoring resource use amounts of the plurality of modules and restricting a function of a second module when a resource use amount of the second module among the plurality of modules is equal to or larger than a reference amount, wherein the generating of the first event comprises;
generating a data field including the message,
generating an event-type field including information about the data field, and
generating the first event including the data field and the event-type field, and wherein the performing of the function of the first module comprises,
processing the first event by performing an inherent function of the first module,
generating a second event based on a result of the processing, and
transmitting the second event to the event handler module.

2. The method of claim 1,
wherein the module combination information is generated by analyzing the user input, resource use amounts of the plurality of modules, and functions of the plurality of modules.

3. The method of claim 1,
wherein the first plurality of modules comprises a message input/output (I/O) engine module, a protocol parser module, a message arbiter module, an application scheduler module, a database module, a topology management module, a switch management module, a host management module, a statistics management module, and a logging module.

4. The method of claim 3, wherein if the user input is an expandability-enhancive mode, the first plurality of modules corresponding to the expandability-enhancive mode further comprise a clustering/mastership module.

5. The method of claim 3, wherein if the user input is a performance-enhancive mode, the first plurality of modules corresponding to the performance-enhancive mode further comprise at least one of a flow rule cache module and a static rule execution module.

6. The method of claim 3, wherein if the user input is a confidentiality-enhancive mode, the first plurality of modules corresponding to the confidentiality-enhancive mode further comprise at least one of an application authentication module and a role-based authentication module.

7. The method of claim 3, wherein if the user input is a data integrity securing mode, the first plurality of modules corresponding to the data integrity securing mode further comprise at least one of a control flow integrity module, an OpenFlow message verification module, a database (DB) version rule conflict resolution module, and a hash table version rule resolution module.

8. The method of claim 3, wherein if the user input is a usability-enhancive mode, the first plurality of modules corresponding to the usability-enhancive mode further comprise a southbound-core separation module, a core-application separation module, an exception management module, and a resource management control module.

9. A modular controller having a plurality of modules in a software-defined network environment, the modular controller comprising a processor and a memory, wherein said processor comprises:

a policy compiler configured to generate module combination information based on a user input;

a controller part configured to activate, among the plurality of modules, a first plurality of modules corresponding to the generated module combination information;

a message input/output (I/O) module configured to receive a message from a network device, and configured to generate a first event including the received message;

an event handler module configured to receive the first event from the message I/O module, and configured to transmit the first event to the first plurality of modules;

a first module, among the first plurality of modules, configured to receive the first event from the event handler module, configured to determine whether the first event is identical to a target event of the first module in event type, and configured to perform a function by using the first event if the first event is identical to the target event; and a resource monitoring part configured to monitor resource use amounts of the plurality of modules and configured to, when a resource use amount of a second module among the plurality of modules is equal to or larger than a predetermined reference amount, restrict performing a function of the second module, wherein the message I/O module is configured to generate a data field including the message and an event-type field including information about the data field, and configured to generate the first event including the data field and the event-type field;

wherein the first module comprises,
a processing part configured to process the first event by performing an inherent function of the first module,
an event generating part configured to generate a second event based on a result of the processing, and
a communication part configured to transmit the second event to the event handler module.

10. The modular controller of claim 9,
wherein the policy compiler is configured to generate module combination information by analyzing the user input, resource use amounts of the plurality of modules, and functions of the plurality of modules.

11. The modular controller of claim 9,
wherein the first plurality of modules comprises a message input/output (I/O) engine module, a protocol parser module, a message arbiter module, an application scheduler module, a database module, a topology management module, a switch management module, a host management module, a statistics management module, and a logging module.

12. The modular controller of claim 11, wherein if the user input is an expandability-enhancive mode, the first plurality of modules corresponding to the expandability-enhancive mode further comprise at least one of a database sharing module and a clustering/mastership module.

13. The modular controller of claim 11, wherein if the user input is a performance-enhancive mode, the first plurality of modules corresponding to the performance-enhancive mode further comprise at least one of a database sharing module, a flow rule cache module, and a static rule execution module.

14. The modular controller of claim 11, wherein if the user input is a confidentiality-enhancive mode, the first plurality of modules corresponding to the confidentiality-enhancive mode further comprise at least one of an application authentication module and a role-based authentication module.

* * * * *